INVENTOR:
ALAN TREVOR LOVEGREEN
By: Malte & Malte
ATTORNEYS

FIG. 5.

United States Patent Office 3,444,998
Patented May 20, 1969

3,444,998
CLASSIFICATION OF GRANULAR MATERIALS
Alan Trevor Lovegreen, 16 Church Lane,
Wallingford, Berkshire, England
Filed July 20, 1967, Ser. No. 654,875
Claims priority, application Great Britain, July 21, 1966, 32,715/66
Int. Cl. B03d 1/16
U.S. Cl. 209—159                              10 Claims

ABSTRACT OF THE DISCLOSURE

Method and apparatus for classifying granular material in which two or more separate countercurrent flows are established at different levels in a vessel containing the main body of liquid. The rates of flow of these countercurrents are separately controllable so that the gradings of the particles entrained by them can be varied at will. The coarse particles are collected in a weighing hopper at the base of the vessel and are automatically discharged at a rate depending on the settling rate. The hopper is sealed into an outer casing with freedom to move vertically, and the space between the hopper and the casing is kept full of clean liquid so as to balance out the weight of water within the hopper and render its weighing action more accurate and sensitive to the weight of coarse fraction. Sets of vertical baffles within the vessel define the separate countercurrent circuits, and transverse jets of liquid are maintained in the main body of liquid adjacent the levels of entry of the falling particles into the respective countercurrents. A manometer device controls the rate of supply of clean liquid to the vessel so as to maintain the required pressure gradient in the vessel.

---

This invention relates to the classification of granular or particulate materials, and particularly to the separation of mixtures containing heavy and light fractions. For convenience of description hereinafter, the granular materials to be classified will be referred to as "sand," it being understood that this term includes other than siliceous substances.

It is known to effect classification of sand into two fractions—containing respectively, coarse and fine grade particles—by introducing the material under treatment into a body of liquid—usually water—and subjecting it to elutriation or hindered settling by a vertical counter-current of liquid. Further separation of these fractions can, it is true, be achieved by repeating the counter-current separating operation in another vessel on either or both fractions.

The present invention is particularly concerned with the problem of effecting classification of such materials into at least three grades or fractions without the necessity of repeating the separating operation on any fraction in a separate vessel, and in a manner which will permit control of the three grades by varying the size distribution of the middle fraction or cut with reference to the coarse fraction, and of the fine cut with reference to the middle cut, by changing the velocity of upward current in either of these circuits.

To this end, the present invention comprises establishing at different respective levels in a single column of liquid such as water, a plurality of upward counter-currents each adapted to entrain a predetermined particle grade or range of grades and each confined, above the level of its establishment, in a separate circuit; introducing the mixture of particles to be classified into the liquid column above the level of establishment of the first counter-current and allowing the particles to fall in the column; maintaining a generally transverse flow of liquid at the level of establishment of each counter-current so as to direct the falling particles thereinto; delivering each counter-current and its entrained particles to a respective discharge point, and collecting and discharging the particles of the heaviest grades at the base of the liquid column.

Preferably, the velocities of the several counter-currents will be controlled so as to entrain particles of up to respective grade limits, and these velocities are advantageously controlled by discharge valves in the outlets of the respective counter-current circuits. Hence the grade limits and ranges of each "cut" or separation are independently controllable.

Conveniently, the falling particles are first deflected radially outwards into the first counter-current, which will carry the bulk of the "fines," as they fall through an annular settling chamber or zone by an upward and radially outward transverse annular jet of liquid generated within the chamber or zone. They may then be mechanically deflected upward by a flat ring thus ensuring that all the initial entering velocity of water has been effectively converted into predominately horizontal movement. The second fraction, which by now is truly free falling after having its initial downward velocity destroyed by impingement on the flat ring, may then subsequently be deflected inwards by an upward and inward transverse annular jet at a lower level of the settling chamber or zone.

Since the present system is based on the establishment in a single vessel of up-current flow of liquid in two separate and separately controllable paths or circuits—the respective flow rates being determined by valve-controlled hydrostatic pressure head conditions—the vessel requires to be sealed.

Furthermore, in accordance with the invention, and in order to maintain the desired pressure differential conditions throughout the operation, provision is made for replacement of the liquid—e.g. water—which is lost from the system with the discharge of the several fractions, and particularly that lost with the discharge of the coarsest fraction. Initially, the flow of makeup liquid is controlled by the pressure obtaining at the level of separation of the coarse fraction, but other levels may be chosen if required by the pressure necessary either to aid the discharge of the coarse fraction or to change the pressure head on the pump for the purpose of changing the pump flow and hence the separating velocity of the fine fraction.

Finally in accordance with the invention provision is made for the automatic discharge of the coarsest fraction from a hydrostatically counterbalanced receptacle. Such receptacle may take the form of a discharge hopper supported in a fixed outer casing by a body of the same liquid—e.g. water—as that used in the settling chamber or zone (and which will for convenience hereinafter be assumed to be water). The hopper is free to rise and fall in the outer casing to a limited extent. Provision is also made for additionally supporting the unladen weight of the hopper and the coarse grade material accumulating therein on resilient load cells mounted in the outer casing.

In starting the elutriation operation, the discharge hopper is filled with water only, the arrangement being such that in this balanced condition a discharge valve at the base of the hopper is closed. Heavy or coarse grade particles accumulating in the hopper cause it to descend, and this displacement is detected and utilised to open the hopper discharge valve. Thereafter the system becomes self-regulating to maintain a rate of discharge equivalent to the rate of settlement of large particles in the hopper.

Further features of the invention will be apparent from the following description of the accompanying drawings which illustrate, by way of example only, one embodiment of the invention and in which.

Figure 2:
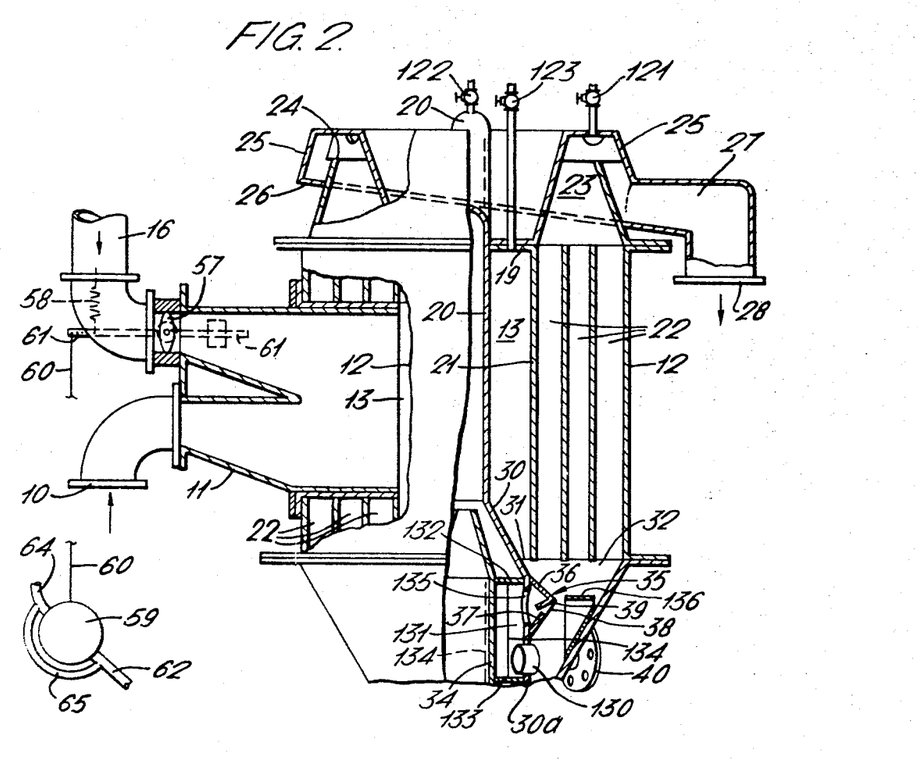
FIGURE 2 is a vertical cross-section of the upper or primary fines recovery portion of the machine shown in FIGURE 1.
Figure 4:
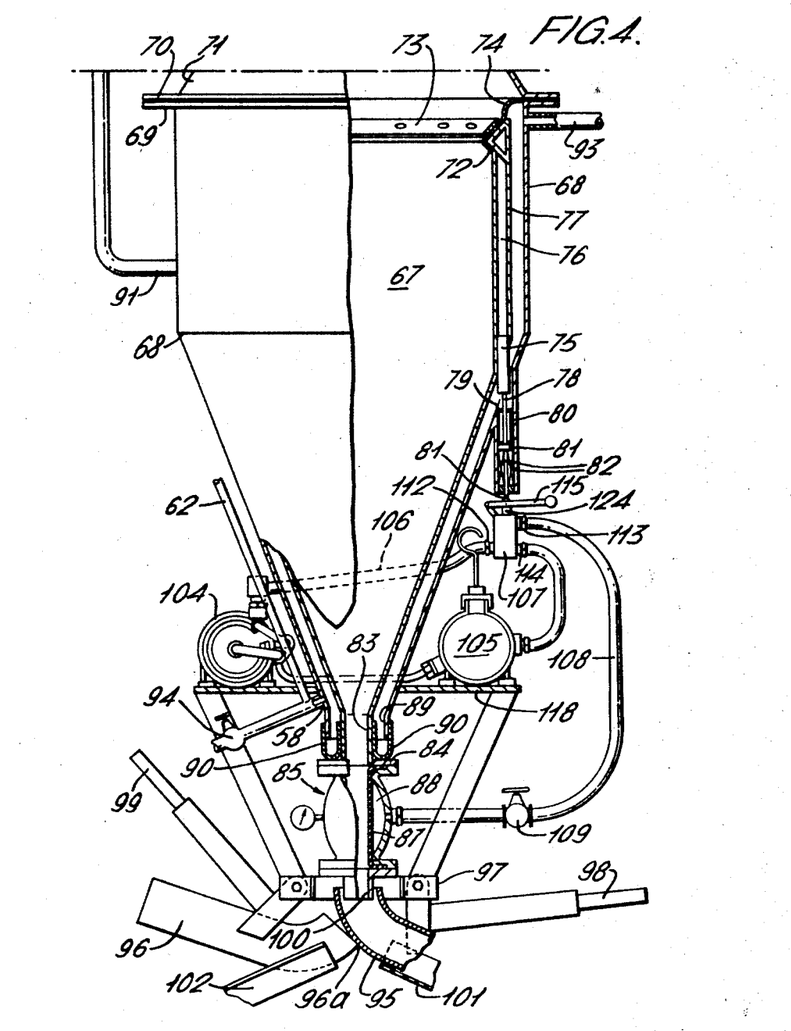
FIGURE 4 is a cross-section similar to FIGURE 2 of the conical discharge hopper.
Figure 4A:
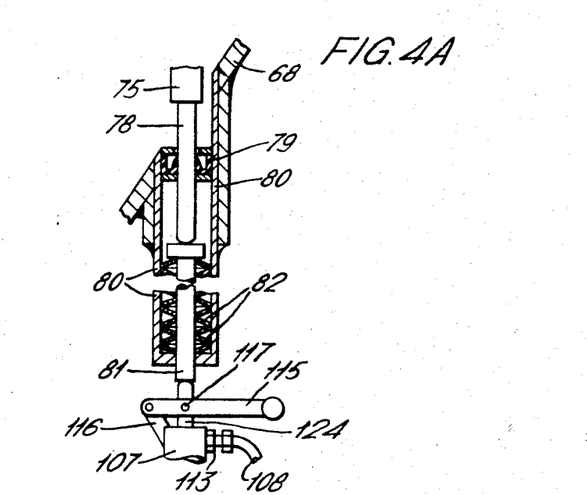
FIGURE 4A illustrates a detail of FIGURE 4.

The machine consists essentially of upper and lower sections which contain a column of water in which particles of different grades are separated. The upper section is shown in FIGURE 2 in which upcurrent flow is established at two levels in two separate and separately controlled paths. The lower section is shown in FIGURE 4 and constitutes the discharge hopper portion of the machine from which graded material is delivered to an ultimate discharge point.

Figure 5:
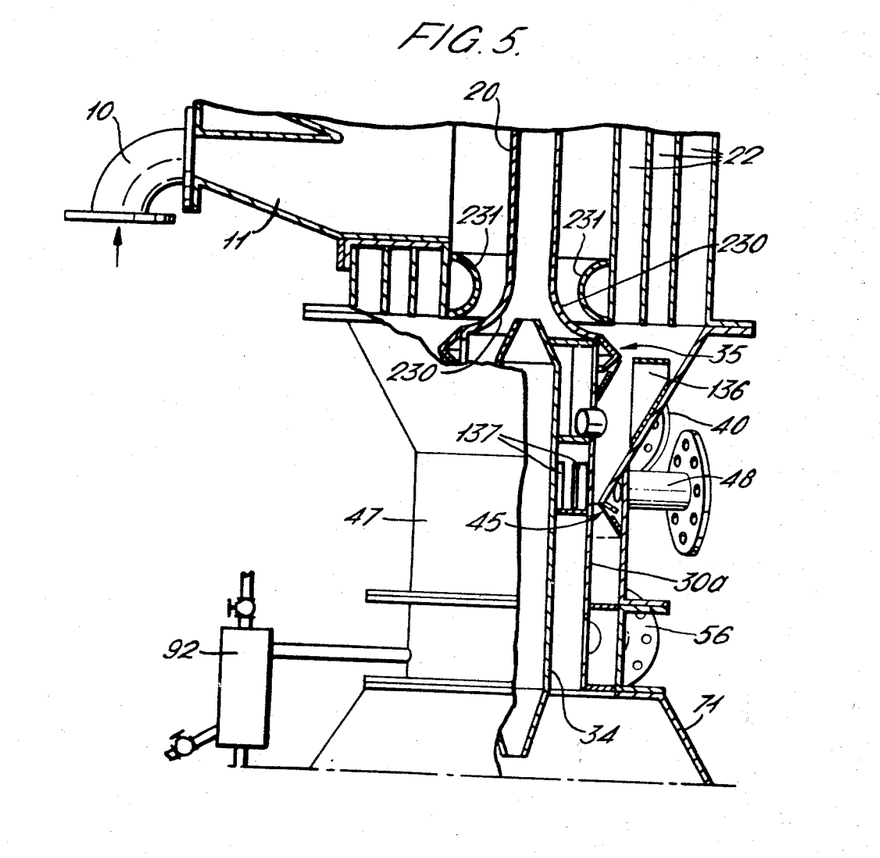
FIGURE 5 is a view similar to FIGURE 2 showing a modified structural detail.

The principle of operation of the machine is wellknown per se in the art of elutriation by counter-current flow of a mixture of solids in aqueous or other liquid suspension. However, the separation and separate control of two upcurrents in the same vessel is an important feature of the present invention. The material to be graded is delivered— normally by pump—through the main sand feed 10 to a high, narrow rectangular inlet nozzle or flare 11 (see also FIGURES 3, and 5) which passes through the outer casing 12 of the machine to open through a narrow rectangular slot into a central annular space 13 (FIGURE 2) which is full of water. Immediately above the sand inlet nozzle 11 is a make-up water inlet 14 fed through a demand control valve 15 and downpipe 16 from a header tank 17 carried on top of the machine structure. This header tank is kept full of clean water by a rising feed pipe 18 and conventional bell mouth weir overflow 18a.

The top of the annular space 13 is closed by a baffle 19 (FIGURE 2) which spans the radial gap between a central secondary fines removal pipe 20, rising coaxially through the annular space 13, and the internal wall 21 of an annular nest of flow-stabilising tubes or ducts 22 which constitute the primary fines removal circuit in the machine. The upper ends of the tubes or ducts 22 open into a frustoconical annular space 23 terminating at its outer edge in a weir 24 embraced by a depending baffle 25. Around the weir 24 and baffle 25 is a closed sloping launder 26 having an outlet 27 from which a primary fines discharge downpipe 28 leads into a weir box 29, and thence to the ultimate disposal point, or alternatively directly into a hydro-cyclone (not shown) in which case the valve 128 (see below) will be in the vortex discharge pipe of the cyclone.

Adjacent the bottom ends of the flow-stabilising ducts 22, the annular space 13 is reduced in cross sectional area by a funnel or flare 30. The material to be graded is delivered by the main sand inlet 11 into the annular space 13 where it is distributed in random fashion and is carried out at a relatively high velocity with a large lateral component through a relatively narrow annular gap 31 into an inverted frusto-conical settling or collecting chamber 32. The top of this chamber is mainly defined by the lower ends of the flow stabilising ducts 22, whilst its lower end registers with the upper end of a cluster of segmental baffles 33 which provide a relatively stablised secondary upcurrent. The centre of the frusto-conical collecting chamber 32 and the baffle cluster 33 is occupied by a cylindrical core 34 whose lower end is spaced above the entry to the discharge hopper 67 (see FIGURE 4).

Surrounding the base of the funnel or flare 30 is an annular transverse jet structure 35 which consists of an angle-section flange 36 below and clear of which is a flared annular plate 37. The rim of the plate 37 is spaced from lower limb of the annular flange 36 whilst its lower edge is welded or otherwise sealed to the external wall of the core 34. The undersurface of the plate 37 carries a relatively stiff resilient rubber or like flap 38, whose upper edge 39 meets, and normally seals against, the annular flange 36. As shown in FIGURE 2, the upper half of this flexible flap is unsupported, save by its own inherent resilience. Its lower portion is tightly sealed to the plate 37.

Water under pressure is supplied to the annular space within the flange 36 through an inlet pipe 40 (FIGURE 1) and control valve 41 from a downpipe 42 from the header tank 17. The connection (see FIGURES 2 and 3) between the pipe 40 and the annular channel defined by the flange 36, plate 37 and flap 38 is made in any convenient manner, but as shown comprises a spigot 130 opening through the outer wall of a cylindrical drum 30a into a local internal header 131 defined by upper and lower baffles 132, 133 and vertical baffles 134 (only one is visible in FIGURE 3) which partition off a short narrow length of the annular passage 20a between the depending cylindrical drum section 30a, which meets the base of the flare 30, and the central core 34. This vertical header 131 in turn communicates through a port 135 with the interior of the annular jet channel. If preferred, a section of pipe may be substituted for the header 131.

The resilient flap 38 acts partly as a non-return valve to prevent particles in the settling or collecting chamber 32 from passing back into the pipe 40, and also as an annular nozzle to allow water under pressure to emerge transversely of the machine axis from between the flaps 38 and the flange 36 in the form of an annular radially and upwardly directed jet for establishing a toroidal circulation in the body of water at the bottom ends of the primary fines circuit baffles 22 which helps to destroy the downward component of velocity in the particles of raw material fed into the machine at 11, and to provide a fine control of the clean water feed.

This destruction of the downward component of velocity is important for achieving an accurate split between fine grade particles and the remainder of the constituents of the input, and in order to supplement the action of the jet stream emerging from the jet assembly 35, a flat annular platform 136 may be mounted in the collecting chamber 32 to arrest particles which succeed in penetrating the annular jet. By the combination of these two features, reasonably stable free-falling particle conditions are established in the collecting chamber 32.

In the alternative construction shown in FIGURE 2A, the flare 30 is replaced by a curved annular wall section 230 the arcuate extent of which in vertical section is approximately 90° and which blends smoothly into the wall of the offtake pipe 20. Opposite this curved section is an annular semi-circular bolster section 231 surrounding the bottom end of the internal wall 21 of the ducts 22.

Figure 6:
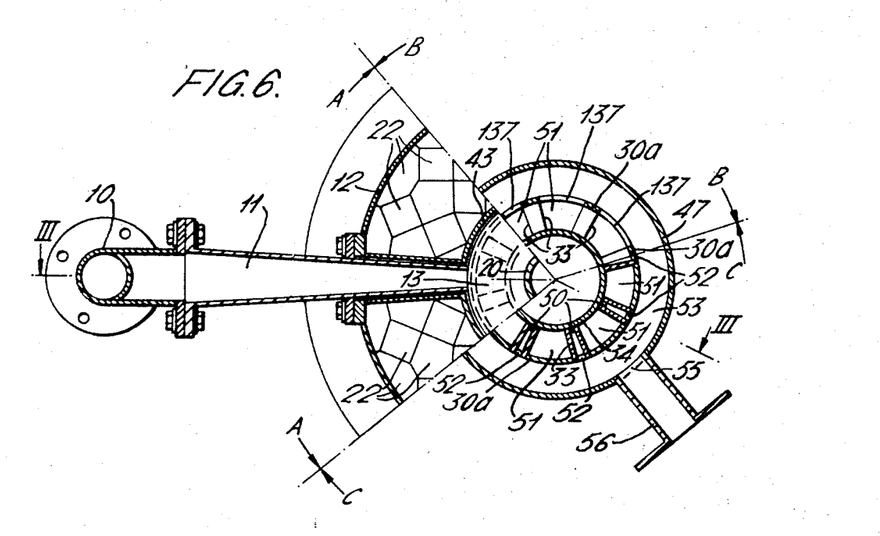
FIGURE 6 is a composite sectional plan on the lines VIA, VIB, VIC, of FIGURE 1.

The inner wall of the chamber 32 is constituted by the cylindrical drum 30a which depends from the base of the flare 30 and continues down to the level of the lower ends of the baffles 33 where it meets the conical wall 71 (see FIGURE 3) which forms a frusto-conical junction section for the discharge hopper 67 (FIGURE 4). Between the level of the bottom of the baffle 133 at the bottom of the short internal header 131 and the jet nozzles 43, a series of closely spaced, relatively wide ports 137 pierce the wall of the drum 30a, each of these ports being angularly coextensive with a corresponding wide-angle openended sector 51 (FIGURE 6) formed by a pair of baffles 33. The radially inward edges of the baffles are secured to the hollow cylindrical core 34 which projects below the baffles at its lower end and into the interior of the flare 30 at its upper end.

A generally similar construction of combined nonreturn flap valve and annular jet nozzle 43 constitutes the lower boundary of the outer wall of the inverted frustoconical collecting chamber 32, the resultant transverse jet being inwardly and upwardly directed. This second annular jet structure 43 consists of an annular channel 44, a conical plate 45 supporting a resilient flap 46, and an outer wall 47 closing the channel and continuing downwards to the entry to the discharge hopper 67 shown in FIGURE 4. An inlet pipe 48 from the header tank 17 opens through a port 49 into the annular space above the plate 45 and is controlled by a valve 149.

Figure 1:
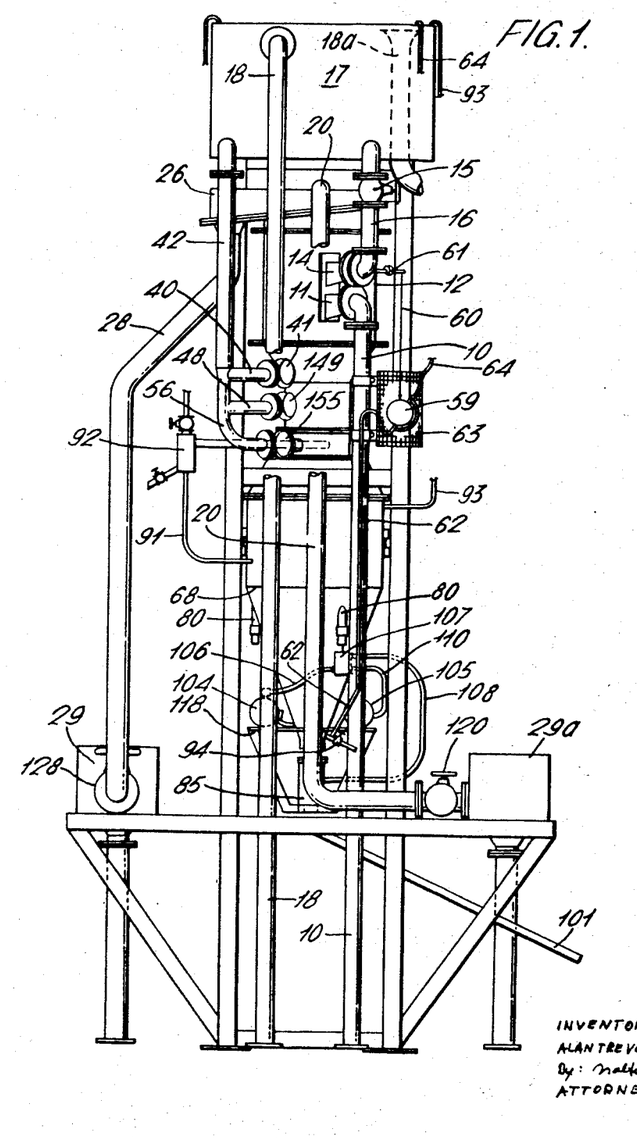
FIGURE 1 is a general view in elevation.

The baffles 33 define alternate unequal-angled sectors 50, 51 (FIGURE 6) between the core 34 and the drum 30a The narrow sectors 50 open near their lower ends through radial ports 52 into an annular header space 53 of approximately half the height of the baffles 33. This header space 53 is sealed from the space below the flap 46 by a horizontal plate 54, and its outer wall has a port 55 through which water is delivered through a valve 155 by a pipe 56 from the same downpipe 42 as supplies the annular jet nozzle 35. The intermediate wide sectors 51 do not open radially into the header 53, but the bottom ends of both the narrow and the wide sectors 50, 51 are open. The former register with upwardly open semi-circular troughs 138 mounted radially between the core 34 and brackets 139 at their outer ends. Thus, water entering the narrow sectors 50 passes downwards and is then deflected upwards by the troughs 138 into the wide sectors 51 through which it rises between the baffles 34, to form the second stage counter-current, and continues via the central off-take pipe 20 to the ultimate discharge point for the secondary fines. In FIGURE 1, the offtake 20 is shown discharging into a weir box 29a similar to the box 29, these weir boxes serving to show the rates of discharge of the respective counter-current circuits. Each pipe 20, 28 is connected to its respective weir box by a flow control valve 120, 128, respectively, which determines the rate of flow, and hence the particle grading in the circuit.

The make-up water inlet 14 is governed by a butterfly valve 57 (FIGURE 2) whose aperture is controlled by a rigid hollow sphere 59 which in turn is suspended by a cord 60 from a counterbalanced valve lever 61 which is also biased by a tension spring 58 anchored to the frame. The sphere is permanently connected by a flexible pipe 62 to the water space between the inner cone 67 and the fixed outer cone 68 (FIGURE 4) of the coarse fraction discharge hopper. The sphere 59 is protected by a cage 63. The cord 60 is adjustable for length in accordance with the required level at which it is desired to establish a manometric level in the column of water standing on the hopper 67. The sphere 59 has a flexible vent pipe 64 and is bypassed by a transparent level indicator tube 65. The cage 63 is also adjustable on brackets which slide on the main sand feed pipe 10, one of the brackets being split and provided with a clamp bolt in conventional manner. The height setting of the sphere 59 controls both the flow of water from the header tank 17 and the weight of water standing on the discharge hopper 67. Since the flow of water through the butterfly valve 57 is by gravity, the manometric level in the column of water within the machine must be low enough to permit this flow. At the same time, the finer the mean grade of the particles collecting in the hopper 67 the more will be the assistance needed from a hydrostatic head on top of the hopper 67 to facilitate sand discharge through the hopper outlet valve 85.

In the event that the pressure required at the discharge hopper necessitates a high manometric level, a sufficient head of water at the header tank can be obtained by sealing the tank 17 and maintaining a constant positive pressure of water therein.

The operation of the machine so far described is as follows:

The raw mixture of solids in suspension is pumped through the main sand inlet pipe 10 to the nozzle 11 and emerges radially into the annular receiver chamber 13. In this chamber the solid particles are dispersed laterally by impingement on the central fines off-take pipe 20 so that their incoming radial velocity is converted to outward radial velocity and they are ejected through the narrow annular gap 31 into the collecting chamber 32. Here they disperse generally radially and encounter a toroidal flow created by the transverse annular jet 35, and sometimes also the flat annular plate 136 which destroys the initial downward component of velocity of the solids and exposes them to the upward counter-current flow into the primary fines stabilising ducts 22. Fine particles become entrained in the flow established in the ducts 22 and are carried over the weir 24 into the launder 26, whence they are delivered by the off-take pipe 28. Heavier particles settle out of the toroidal flow created by the transverse jet 35 and fall under gravity through the ports 137 under the action of the radial inward and upward jet 43. The middle grade particles are carried into a rising current of water from the inlet 55 via the sectors 51. Any fine particles which escape the primary fines off-take circuit 22, together with medium-coarse particles up to a pre-selected maximum grade, become entrained in the secondary up-current from the sectors 51 and pass upwards through the secondary fines off-take ducts 34 into the pipe 20 and thence to discharge.

Meanwhile, the residual coarse grade or heavy particles continue their descent through the open-ended wide sectors 51 into the mouth of the discharge hopper 67 (see FIGURE 4).

Any fluctuations in the hydrostatic pressure balance in the machine due to random variations in water and sand inputs and in water and sand outputs from the hopper 67 are made up by corresponding variations in the supply of make-up water through the make-up water inlet 14 under the general control of the manual valve 15 and the fine control of the butterfly valve 57. This valve is opened as the pressure balance level falls, since water will drain out of the sphere 59 and so lighten the load on the valve lever 61. Similarly, any rise in the pressure level results in a flow of water into the sphere 59, increasing the load on the lever 61 and closing the butterfly valve 57.

Referring now to FIGURE 4, the discharge hopper 67 is mounted for controlled vertical reciprocation within an outer fixed cone 68 secured by a flange 69 to a similar flange 70 at the base of the frusto-conical junction section 71. The top rim of the hopper 67 is defined by a triangular-section annulus 72, to the upper sloping surface of which is clamped, by means of a clamp ring 73, a flexible seal 74. The other edge of this seal is clamped between the flanges 69, 70. At intervals around the hopper 67 are fixed vertical bearing pegs 75 (only one is shown in FIGURE 4) which are located in sealed pockets 76 around the upper cylindrical wall 77 of the hopper. These bearing pegs 75 rest on plungers 78 which are slidable in glands 79 within tubular housings 80 which open through and are sealed into the conical wall of the fixed cone 68. Each plunger 78 rests in turn on the flanged head of a pin 81 passing axially through a stack of resilient dished washers 82, the assembly constituting a load cell.

The bottom end of the discharge hopper 67 is formed by a short cylindrical spigot 83 terminating at its lower end in a flange 84 which carries a so-called Clarkson valve 85 of proprietary manufacture. This valve has an outer generally barrel-shaped body 86 within which is sealed a flexible tubular sleeve 87. Between the sleeve and the body is formed an annular chamber 88 filled with hydraulic fluid so that a rise in pressure of this fluid will cause collapse of the sleeve 87 to close the passage therethrough, as described below.

Figure 3:
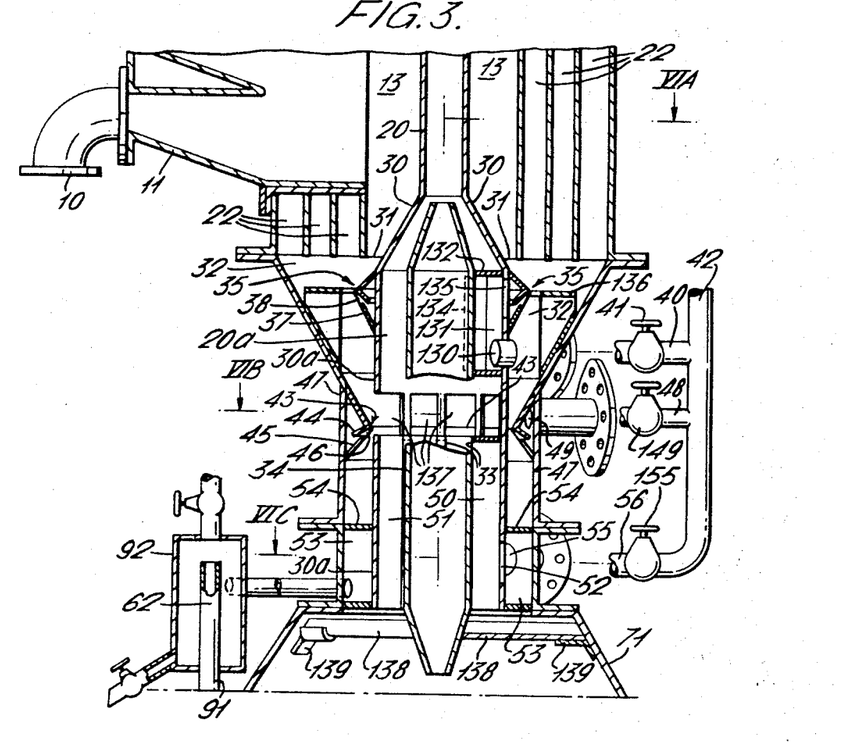
FIGURE 3 is a view similar to FIGURE 2, but on a larger scale, of the middle or secondary fines recovery portion, the section being taken on the line III—III of FIGURE 6.

The outer fixed cone 68 also terminates in a short cylindrical spigot 89, and a generally U-shaped flexible seal 90 which, together with the upper annular seal 74, encloses the annular space between the hopper 67 and the fixed cone 68. This space is kept full of water by means of a pipe 91 (FIGURE 1) which takes its supply from a sand trap 92 connected to the header 53 (FIGURE 3). An air vent pipe 93 exhausts air from the top of the annular space between the hopper 67 and the fixed cone 68. Water is exhausted from the bottom of this space by a valve 94.

During operation of the machine, the space between the hopper and the fixed cone is kept full of water which serves to support the weight of clean water within the hopper 67, the load cells 78 . . . 82 serving to support the unladen weight of the hopper 67 and the weight of the coarse graded sand content.

The outlet from the Clarkson valve 85 is a short spigot 100 which registers with either of two hinged chutes 95, 96 pivoted on a common yoke 97. Each chute is raised or lowered by means of a respective handle 98, 99, the arrangement being such that the butt end of each chute is normally biased by its own weight to the position of registration with the spigot 100—in FIGURE 4, the chute 95 is in such a position. Since only one chute can occupy the position of registration at any one time, the butt end of the other chute rests against the underside of the registering chute, as shown at 96a in the drawing.

In their register or lowered positions, the chutes rest in respective fixed open channels 101, 102 which serve to deliver the graded sand discharged from the hopper to the stockpile.

The hopper outlet valve 85 is operated by a pressure fluid circuit including a pump 104, a reservoir 105, a pressure line 106, an automatic valve 107, a pressure and exhaust line 108 between the valve 107 and the outlet valve 85 and provided with a manual shut-off valve 109, and a pipe connection 110 between the valve 107 and the reservoir 105. The latter is connected to the pump inlet by a return pipe 111.

The automatic valve 107 is of generally conventional construction having three ports 112, 113 and 114, and an internal spool valve (not shown) which connects the port 113 either to the pressure line 106 from the pump 104 or to the exhaust line 110 to the reservoir 105. The spool is reciprocated by a plunger 124 whose upper end is engaged by the load cell pin 81, and a hand lever 115, pivoted at one end in a bracket 116 fixed to the casing of the automatic valve 107, is pinned at 117 to the plunger 124. Depression of the hand lever 115 moves the spool to connect the ports 112, 113 so that pressure fluid is delivered by the pump 104 to the chamber 88 of the outlet valve 85 via the line 108 and manual valve 109. The pump 104 and the reservoir 105 are mounted on a platform 118 fixed to the outer cone 68 of the discharge hopper assembly.

In normal operation of the machine, the pin 81 moves up and down according to the weight of sand in the hopper 67. When this weight is low, the hopper 67 is raised by the spring 82 and the plunger 124 of the automatic valve 107 rises with it, thus causing the spool of the valve 107 to interconnect the ports 112 and 113 for the supply of hydraulic fluid under pressure to the chamber 88 of the hopper outlet valve 85. The flexible sleeve 87 of the latter is thus squeezed flat to shut the valve. As the sand load increases, however, the pin 81 descends and moves the spool down to cut off the pump pressure from the outlet valve 85 and open the line 108 to the reservoir 105. The pressure in the outlet valve chamber 88 thus falls, and the pressure of the contents of the hopper 67 forces the sleeve 87 to open and discharge the hopper. The weight of the latter is thus reduced the springs 82 of the load cells 80 raise the hopper 67 and the pin 81 rises, allowing the plunger 124 and its spool to move upwards so as to change over the port connections in the valve 107. The pump 104 thus delivers hydraulic fluid under pressure to the chamber 88 to collapse the sleeve 87 and reclose the hopper outlet valve 85.

Preparatory to starting up the machine described above, the pump 104 is started. Since there is no sand load in the hopper 67, the spool of the automatic valve 107 is raised to connect the pump to the outlet valve chamber 88 and the sleeve 87 is collapsed. The manual valve 109 is now shut, and the machine is filled with clean water. The hopper 67 is then light enough to be held in the raised position by the water in the outer cone 88 and the load cell springs 82. The manual valve 109 is opened and the pump 104 maintains the pressure in the chamber 88 to keep the outlet valve 85 shut. When sand is introduced through the sand inlet pipe 10, the hopper 67 begins to fill with coarse grade particles until its weight overcomes the springs 82. The hopper 67 begins to move down and the pin 81 depresses the plunger 124 until the automatic valve 107 releases the pressure in the outlet valve chamber 88. The outlet valve 85 now opens, and the system settles down to a general condition of balance in which the discharge from the hopper 67 is fairly continuous so long as coarse grade particles continue to fall into the hopper 67.

To shut the machine down, the following procedure is adopted:

(1) First cut off the supply of sand but leave the pumps running.
(2) When the hopper outlet valve 85 remains closed, empty the hopper by manual depression of the lever 115 until no sand remains.
(3) Stop sand pump. When the main flow stops, change over the chutes 101, 102.
(4) Shut off fresh water supply to the header tank.
(5) Switch off the oil pump 104. Leave all other controls alone.

Restarting:
(1) Start oil pump 104.
(2) Change to automatic control.
(3) Start fresh water supply.
(4) Start sand pump on water only.
(5) When machine settles, feed sand.

It should be noted that in some cases it may be advantageous to provide air bleeds at 121 (FIGURE 2) in the top wall of the launder 26; at 122 in the top of the bend in the secondary countercurrent offtake pipe 20 where it passes over the weir 24, and at 123 in the top wall 19 of the annular inlet space 13.

The pipes 20 and 28 must be capable of handling flows in excess of the maximum capacity of the feed pump delivering sand to the inlet 10 in order to prevent the possibility of feed-back of water and particles into the tank 17.

From the foregoing description it will be evident that more than two "splits" can be achieved by a simple extension of the design of the machine. For example, a further annular jet corresponding to that shown at 45 in FIGURE 3 may replace the troughs 138 so that some of the coarse particles which would otherwise have passed into the hopper 67 can be diverted up a tertiary fines offtake which is represented by the central hollow core 34 in the accompanying drawings. By suitably re-shaping or re-proportioning the ends of this core, and continuing its upper end concentrically through the pipe 20, the offtake would provide a further grading of the feed material. Alternatively, by shutting off one of the fines recovery circuits—preferably the lower or secondary fines circuit 20, 33, 45—the machine can be operated as a single stage or simple countercurent elutriator. The following data illustrates the operation of the machine in practice.

A customer required fine aggregate meeting the following specification:

100% passing No. 7 B.S. Sieve
35% to 85% passing No. 25 B.S. Sieve
0% to 3% passing No. 52 B.S. Sieve In addition it was required that 70% of the product above 52 mesh should report to the coarse fraction. In the test reported below, 70% of the +52 fraction is approximately equal to 50% of the raw feed.

A conventional screw classifier machine yielded 12% total feed reporting to the coarse fraction according to customer's specification. The remaining 88% of the feed was waste material.

Raw feed from the identical source was then split in the machine according to the present invention and yielded 42.4% coarse fraction to customer's specification. Of the remainder, 38% of the raw feed was split at the primary fines circuit 22 and delivered via the launder 26 to provide good quality foundry sand.

The remaining 19.6% of the feed derived from the secondary fines circuit 20 was added to a quantity of gap-graded —¼ inch concreting sand in order to bring it into conformity with B.S. 882 (Zone 2) concreting sand.

From the foregoing it is evident that a much higher proportion of coarse product was obtained from the machine according to the present invention as compared with the conventional screw classifier. Furthermore, the output of the screw classifier was predominantly waste material (88 tons lost out of every 100 tons raw feed). The machine according to the present invention, on the other hand produced 38% of the raw feed as saleable foundry sand and the balance of 19.6% was able to be used in order to bring a previously sub-standard batch up to standard.

A second test was run on the machine using the same feed as in a previous test, the second stage 20, 33, 45 of the machine being shut off by the closure of the valves 120, 149 and 155. The machine was then operated at various rates of flow as a conventional counter-current elutriator. At each speed, the coarse and fine fractions were analysed, the rate of flow being increased in steps with a view to meeting the above mentioned customer's requirement of a coarse product having less than 3% graded —52.

In the first test, the rate of flow measured in the ducts 22 was 7.2 cm. per second. The split obtained was analysed as follows:

Coarse, percent | Mesh
--- | ---
100 | —7
97 | —14
81 | —25
58 | —36
34 | —44
19 | —52
9.5 | —60
3 | —72
0 | —100

Fine, percent |
--- | ---
99 | —36
88 | —44
59 | —52
50 | —60
26 | —72
6 | —100
0 | —150

The above test produced 62% coarse product including 19% graded —52 and 38% fine product.

Successive tests at higher speeds failed to meet the customer's specification. At a flow rate of 17.1 cm. per second, no fines graded —52 were obtained but only 3% of the feed reported to the coarse fraction. 97% was delivered as fines. Hence, the other requirement of the customer's specification, viz 35% to 85% graded —25 was not met.

Using the same raw feed, the machine was operated at a flow rate of 7.2 cm. per second with the valves 120, 149 and 155 open, bringing the second stage fines recovery circuit into full operation. The following analysis of the coarse fraction was then obtained:

Percent: | Mesh
--- | ---
100 | —7
91 | —40
63 | —25
31 | —36
10 | —44
3 | —52
1 | —60
0.1 | —72

This is the analysis of the 42.4% coarse product to customer's specification as noted above.

Typical designed performance figures for a machine according to the present invention producing three fractions from a raw feed are given in the table below:

| Machine diameter, ft | Primary rising current velocity, in./sec. | | | | | |
|---|---|---|---|---|---|---|
| | 0.5 | 1.0 | 2.0 | 4.0 | 8.0 | 16.0 |
| 1 | 8 | 16 | 32 | 65 | 130 | 260 |
| 2 | 33 | 66 | 132 | 264 | 528 | 1,056 |
| 3 | 74 | 148 | 296 | 592 | 1,184 | |
| 4 | 130 | 260 | 520 | 1,040 | | |
| 5 | 204 | 408 | 816 | 1,632 | | |
| 6 | 296 | 592 | 1,184 | | | |
| 7 | 400 | 800 | 1,600 | | | |
| 8 | 504 | 1,008 | Pulp feed rate, gal./min. | | | |
| 9 | 640 | 1,280 | | | | |
| 10 | 820 | 1,640 | | | | |
| | 150 | 85 | 30 | 16 | 6 | 3 |
| | Approx. B.S. mesh size of particles lifted | | | | | |

A flow of 100 gal./min. is approximately equal to 10–11 tons/hr. of sand. The secondary upward current velocity is infinitely variable but has no direct effect on the machine capacity.

Machines of a diameter less than 2 feet are not thought to be economic. For demands above 10 feet diameter, it is likely to be more economic to use two smaller machines in parallel.

I claim:

1. The method of classifying mixtures of granular or particulate solids into a plurality of grades comprising introducing the solids into a single body of liquid and allowing them to fall naturally therein; establishing, in separate circuits each in open communication with the said body of liquid at a respective level thereof, independent countercurrents each adapted to entrain a particular grade of particle; subjecting the falling solid particles to relatively higher speed transverse currents adjacent each zone of open communication between the said body of liquid and a respective countercurrent circuit; and collecting the residual particles at the bottom of the said body of liquid.

2. The method according to claim 1 wherein each transverse flow pattern is created by an annular jet of clean liquid discharged into the body of liquid at each level of open communication with a respective countercurrent flow of liquid.

3. The method according to claim 1 wherein the jet is angled so as to establish a generally toroidal circulation in the respective zone of the settling chamber.

4. The method according to claim 1 wherein the raw feed is introduced in a liquid vehicle and this vehicle is withdrawn at the highest level of countercurrent offtake.

5. Apparatus for classifying granular or particulate materials into a plurality of grades comprising a vessel for containing a body of liquid; an upper annular set of vertical baffles defining a primary fines uptake circuit adjacent the upper end of the vessel and discharging into a closed space at the top of the vessel; a primary fines offtake from said closed space; a central input chamber within said primary baffles; input ducts for granular material and clean liquid, respectively, each opening into said central chamber; valve means for controlling the supply of clean liquid; a settling chamber below said primary baffles in open communication therewith and with the lower end of said input chamber; a lower set of vertical baffles defining a secondary fines countercurrent circuit in open communication with said settling chamber at a level below the primary baffles; an annular jet structure for directing a transverse flow of clean liquid substantially radially into said settling chamber adjacent the lower ends of said secondary baffles; a clean liquid inlet to said jet structure; a clean liquid inlet to the lower ends of said secondary baffles; a secondary fines offtake; and a coarse fraction discharge hopper open to said settling chamber below the level of said secondary baffles.

6. Apparatus according to claim 5 wherein the discharge hopper is resiliently supported within a fixed outer casing for vertical reciprocation therein, and the space between said hopper and said outer casing is sealed in liquid-tight manner and communicates with the clean liquid inlet at the lower ends of the secondary baffles, the hopper having an outlet valve controlled by the vertical displacement of the hopper within the outer casing.

7. Apparatus according to claim 6 wherein the clean liquid supply valve is biased to the closed position and mechanically linked to a manometric device for opening the valve against said bias.

8. Apparatus according to claim 7 wherein the manometric device comprises a liquid container whose interior is in open communication with the liquid space between the hopper and the fixed outer casing at a level adjacent the hopper outlet.

9. Apparatus according to claim 5 wherein a further annular jet structure is provided for directing a transverse flow of clean liquid into said settling chamber below the level of the primary baffles and a valve-controlled inlet pipe communicates directly with said annular structure.

10. Apparatus according to claim 5 wherein the annular jet structure comprises an annular channel opening into the settling chamber and defined by an annular wall forming part of a side wall of the settling chamber and a cone-shaped resilient flap sealed to the side wall of the chamber at its lower edge and cooperating at its upper edge with said annular wall and adapted to be forced away therefrom when the liquid pressure within said channel exceeds that in said settling chamber.

References Cited

UNITED STATES PATENTS

| | | | |
|---|---|---|---|
| 1,729,545 | 9/1929 | Marchant | 209—158 |
| 2,361,207 | 10/1944 | Horsfield | 209—160 |
| 2,723,030 | 11/1955 | Drigenko | 209—160 |
| 3,035,697 | 5/1962 | Koch | 209—161 |
| 3,258,121 | 6/1966 | Ley | 209—160 |
| 3,280,976 | 10/1966 | Hirst | 209—158 |

FOREIGN PATENTS 236,947  12/1925  Great Britain.

FRANK W. LUTTER, *Primary Examiner.*

U.S. Cl. X.R.

209—496; 222—58